(12) United States Patent
Bradley et al.

(10) Patent No.: US 12,391,082 B2
(45) Date of Patent: Aug. 19, 2025

(54) AXLE-TO-BEAM CONNECTION FOR HEAVY-DUTY VEHICLE AXLE/SUSPENSION SYSTEMS

(71) Applicant: Hendrickson USA, L.L.C., Schaumburg, IL (US)

(72) Inventors: Andrew L. Bradley, Mount Vernon, OH (US); Andrew J. Westnedge, Granville, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 0 days.

(21) Appl. No.: 18/676,735

(22) Filed: May 29, 2024

(65) Prior Publication Data
US 2024/0399807 A1    Dec. 5, 2024

Related U.S. Application Data

(60) Provisional application No. 63/469,850, filed on May 31, 2023.

(51) Int. Cl.
*B60G 9/00* (2006.01)

(52) U.S. Cl.
CPC .......... *B60G 9/003* (2013.01); *B60G 2200/31* (2013.01); *B60G 2204/12* (2013.01); *B60G 2204/4306* (2013.01); *B60G 2204/44* (2013.01); *B60G 2204/45* (2013.01); *B60G 2300/026* (2013.01)

(58) Field of Classification Search
CPC ................ B60G 9/003; B60G 2200/31; B60G 2204/4306
See application file for complete search history.

(56) References Cited

U.S. PATENT DOCUMENTS

| | | |
|---|---|---|
| 3,547,215 A | 12/1970 | Bird |
| 4,506,910 A | 3/1985 | Bierens |
| 4,566,719 A | 1/1986 | Van Denberg |
| 4,615,539 A | 10/1986 | Pierce |
| 5,037,126 A | 8/1991 | Gottschalk et al. |
| 5,112,078 A | 5/1992 | Galazin et al. |
| 5,127,668 A | 7/1992 | Raidel |
| 5,328,159 A | 7/1994 | Kaufman et al. |
| 5,476,251 A | 12/1995 | Moses et al. |
| 5,791,743 A | 8/1998 | Sitter et al. |
| 5,921,570 A | 7/1999 | Lie |

(Continued)

FOREIGN PATENT DOCUMENTS

| | | |
|---|---|---|
| EP | 0625440 A1 | 11/1994 |
| EP | 1088687 A1 | 4/2001 |

(Continued)

*Primary Examiner* — Paul N Dickson
*Assistant Examiner* — Tiffany L Webb
(74) *Attorney, Agent, or Firm* — Dureska & Moore, LLC; David P. Dureska; David J. Danko

(57) ABSTRACT

An axle-to-beam connection for an axle/suspension system of a heavy-duty vehicle that includes an axle, a beam with an alignment assembly, and an axle mount assembly. The alignment assembly is integrally formed with or is rigidly attached to the beam. The axle mount assembly intimately contacts and captures the axle. The axle is rigidly secured to the axle mount assembly without line welds. The axle mount assembly is removably connected to the alignment assembly to secure the axle to the beam.

20 Claims, 11 Drawing Sheets

(56) References Cited

U.S. PATENT DOCUMENTS

| | | |
|---|---|---|
| 6,508,482 B2 | 1/2003 | Pierce et al. |
| 8,292,313 B2 | 10/2012 | Pierce et al. |
| 8,371,596 B2 | 2/2013 | Johnson et al. |
| 8,419,029 B2 | 4/2013 | Muckelrath et al. |
| 8,454,040 B2 | 6/2013 | Westnedge et al. |
| 8,490,989 B2 | 7/2013 | Piehl et al. |
| 8,764,038 B2 | 7/2014 | Piehl et al. |
| 9,186,947 B2 | 11/2015 | Kopplow et al. |
| 11,118,645 B2* | 9/2021 | Gregg .................... B60G 11/10 |
| 11,130,379 B2 | 9/2021 | Miller et al. |
| 2005/0253351 A1 | 11/2005 | Pan et al. |
| 2011/0095501 A1 | 4/2011 | Piehl et al. |
| 2015/0014953 A1 | 1/2015 | Pierce et al. |
| 2020/0070607 A1 | 3/2020 | Miller et al. |
| 2025/0010677 A1* | 1/2025 | Lindsay ................. B60G 9/003 |

FOREIGN PATENT DOCUMENTS

| | | |
|---|---|---|
| EP | 1334848 A1 | 8/2003 |
| EP | 2253490 A1 | 11/2010 |
| FR | 2810274 A1 | 12/2001 |
| GB | 2068856 A | 8/1981 |
| JP | 2001010318 A | 1/2001 |
| WO | 2004110795 A2 | 12/2004 |

* cited by examiner

AXLE-TO-BEAM CONNECTION FOR HEAVY-DUTY VEHICLE AXLE/SUSPENSION SYSTEMS

CROSS-REFERENCE TO RELATED APPLICATION

This application claims the benefit of U.S. Provisional Patent Application Ser. No. 63/469,850 filed on May 31, 2023.

BACKGROUND

Technical Field

The disclosed subject matter is directed to axle/suspension systems for heavy-duty vehicles. In particular, the subject matter is directed to axle-to-beam connections for heavy-duty vehicle axle/suspension systems. More particularly, the subject matter is directed to an axle-to-beam connection for heavy-duty vehicle axle/suspension systems which includes a structure that enables an axle of the axle/suspension system to be accurately aligned with and quickly and securely attached to a beam of a suspension assembly of the axle/suspension system. The axle-to-beam connection of the disclosed subject matter provides a strong and secure connection between the axle and the beam, while eliminating line welds on the axle, thereby minimizing stress on the axle, and providing a stronger, more resilient axle-to-beam connection. Furthermore, the axle-to-beam connection of the disclosed subject matter enables shipment of the axle and suspension assemblies of the axle/suspension system separately and facilitates quick and simplified on-site alignment and attachment of the axle to the beams of the suspension assemblies without the need for welding equipment. Moreover, as the axle-to-beam connection of the disclosed subject matter facilitates quick and simplified alignment and attachment of the axle to the beams without the need for welding equipment, the axle-to-beam connection provides improved field serviceability to the axle, beam, and/or components of the axle-to-beam connection. In addition, the axle-to-beam connection of the disclosed subject matter includes a structure that acts as a mechanical bump stop to prevent potential damage to the beam, axle, frame of the heavy-duty vehicle, and/or components of the axle-to-beam connection during jounce events, and decreases manufacturing costs and complexity of the axle/suspension system.

Background Art

The use of air ride axle/suspension systems in the heavy-duty vehicle industry is known. For purposes of conciseness and clarity, reference shall be made generally throughout to a heavy-duty vehicle with the understanding that such reference includes trucks, tractor-trailers and semi-trailers, trailers, and the like. Although axle/suspension systems can be found in widely varying structural forms, in general their structure is similar in that each system typically includes a pair of suspension assemblies. The suspension assemblies are typically connected directly to the primary frame of the heavy-duty vehicle or to a subframe supported by the primary frame. For those heavy-duty vehicles that support a subframe, the subframe can be non-movable or movable, the latter being commonly referred to as a slider box, slider subframe, slider undercarriage, secondary slider frame, or bogey.

Typically, each suspension assembly of an axle/suspension system includes a longitudinally extending elongated beam. The beam is located adjacent to and below a respective one of a pair of spaced apart longitudinally extending main members and one or more cross members that form the frame or subframe of the heavy-duty vehicle. For purposes of conciseness and clarity, reference shall be made throughout generally to a main member with the understanding that such reference includes main members of primary frames, movable subframes and non-movable subframes, and the like. Each beam is pivotally connected at one of its ends to a hanger, which in turn is attached to and depends from a respective one of the main members of the heavy-duty vehicle. Each beam may extend rearward or frontward relative to the front of the heavy-duty vehicle, thus defining what are typically referred to as trailing-arm or leading-arm axle/suspension systems, respectively. However, for purposes of the description contained herein, it is understood that the term trailing-arm encompasses beams extending either rearward or frontward with respect to the front end of the heavy-duty vehicle.

An axle extends transversely between and is typically irremovably connected to the beams of the pair of suspension assemblies via axle-to-beam connections, and associated structure, at a selected location from about the midpoint of each beam to the end of the beam opposite the pivotal connection to the hanger. An air spring, or its equivalent, extends between and is connected to the beam at the end of the beam opposite its pivotal connection to the hanger and the main member of the frame of the heavy-duty vehicle. A brake assembly and one or more shock absorbers may also be mounted on each of the beams and/or axle.

It is also common for the axle/suspension system to feature a lift assembly that enables one or more of the axles of the heavy-duty vehicle to be lifted and maintained in a raised position, such that the wheels rotatably mounted on the axles are lifted off of the ground. Such lift assemblies are typically used when the heavy-duty vehicle is free of payload, such that fewer than all the wheels can adequately support the heavy-duty vehicle, or when greater maneuverability of the heavy-duty vehicle is desired. Lifting and maintaining the heavy-duty wheels off of the ground results in reduced wear on the lifted axle and the respective wheels. In addition, lifting one or more axles may provide reduced heavy-duty vehicle operational costs because toll costs are often determined based on only those axles which have wheels in contact with the ground.

The axle/suspension system generally acts to cushion the ride, dampen vibrations, and stabilize the heavy-duty vehicle. More particularly, as the heavy-duty vehicle is traveling over the road, the wheels of the heavy-duty vehicle may encounter road conditions that impart various forces, loads, and/or stresses, to the respective axle on which the wheels are mounted, and in turn, to the suspension assemblies of the axle/suspension system connected to and supporting the axle. More particularly, during jounce events, road conditions may impart an upward force directed to the wheel of the heavy-duty vehicle, which causes the attached axle and respective suspension assembly beam to travel upwardly. In axle/suspension systems that include certain prior art axle-to-beam connections, bump stops are utilized to absorb forces and prevent contact between, and potential damage to, the axle, components of the axle-to-beam connection, and/or the main members of the heavy-duty vehicle during jounce events. Bump stops can be discrete components attached to the axle/suspension system beam and/or main members, or can be incorporated into other components of the axle/suspension system, such as the air spring.

Prior art axle-to-beam connections, while adequately securing the axle to the suspension assemblies of the axle/suspension system, have potential disadvantages, drawbacks, and limitations. For example, prior art axle-to-beam connections typically employ one or more line welds to secure the axle to the beams of the suspension assemblies. In certain configurations of prior art axle-to-beam connections, welding alone is typically inadequate to secure the axle to the beam and maintain the integrity of the rigid axle-to-beam connection due to certain forces acting on the axle-to-beam connection during heavy-duty vehicle operation. As a result, such axle-to-beam connections are fortified with suitable means, such as with U-bolts, U-bolt brackets or axle seats attached to or integrated into the beam, line welds, other additional mounting hardware, and/or the like, to maintain integrity and prevent separation of the axle from the beams. However, even with such fortification, the prior art axle-to-beam connections, as well as the axle itself, can potentially exhibit less than optimal fatigue strength and service life. In particular, line welds between the axle and the U-bolt bracket/axle seat and areas of the axle near the axle-to-beam connection may exhibit reduced durability in certain heavy-duty vehicle applications, such as operation on harsh road surfaces. More particularly, line welds are discrete welds that start at one point and terminate at a separate point, as is known. The starting and termination points of line welds create areas that are susceptible to stress, known as stress risers, as is also known. Loads and forces acting on the axle are transferred almost entirely through the line welds attaching the U-bolt bracket/axle seats to the axle, such that the forces imposed on the axle-to-beam connection may potentially compromise the axle and/or the axle-to-beam connection due to stress risers.

Moreover, prior art axle-to-beam connections are typically pre-assembled during the manufacturing process of the axle/suspension system, such that the axle is irremovably attached to the U-bolt bracket or axle seats via welds. As a result, the axle/suspension systems must be shipped with the axle attached to the beams of the suspension assemblies, increasing the amount of space and cost of shipment as compared to shipping the axle and suspension assemblies separately. Furthermore, as prior art axle-to-beam connections typically require welds to secure the axle to the beams, if the axle, beam, and/or components of the axle-to-beam connection become damaged during operation of the heavy-duty vehicle, servicing or replacement of such components in the field may be difficult or impossible. More specifically, in order to service or replace such components, the welds of the axle-to-beam connection may have to be removed prior to servicing or replacement, and the axle rewelded to the beam via the axle-to-beam connection subsequent to servicing or replacement of the component(s), which can be difficult to perform in the field and typically requires specialized equipment that the vehicle operator and/or service technician may not have access to in the field. In addition, as described above, bump stops or other discrete protection means are typically required to protect the beam, axle, frame of the heavy-duty vehicle, and/or components of the axle-to-beam connection during jounce events. However, such bump stops or other discrete protection means may undesirably increase the weight of the axle/suspension system.

Thus, a need exists in the art for an axle-to-beam connection for heavy-duty vehicle axle/suspension systems that enables an axle of the axle/suspension system to be accurately aligned with and quickly and securely attached to a beam of a suspension assembly of the axle/suspension system. There is also a need in the art for an axle-to-beam connection that provides a strong and secure connection between the axle and the beam, while eliminating line welds on the axle, thereby minimizing stress on the axle, and providing a stronger, more resilient axle-to-beam connection. Furthermore, there is a need in the art for an axle-to-beam connection that enables shipment of the axle and suspension assemblies of the axle/suspension system separately and facilitates quick and simplified on-site alignment and attachment of the axle to the beams of the suspension assemblies without the need for welding equipment. Moreover, there is a need in the art for an axle-to-beam connection that provides improved field serviceability to the axle, beam, and/or components of the axle-to-beam connection. In addition, there is also a need in the art for an axle-to-beam connection that includes a structure that acts as a mechanical bump stop to prevent potential damage to the beam, axle, frame of the heavy-duty vehicle, and/or components of the axle-to-beam connection during jounce events, and decreases manufacturing costs and complexity of the axle/suspension system.

The axle-to-beam connection for heavy-duty vehicle axle/suspension systems of the disclosed subject matter satisfies these needs and overcomes the above described disadvantages, drawbacks, and limitations, and will now be described.

BRIEF SUMMARY OF THE DISCLOSED SUBJECT MATTER

An objective of the disclosed subject matter is to provide an axle-to-beam connection for heavy-duty vehicle axle/suspension systems that includes a structure that enables an axle of the axle/suspension system to be accurately aligned with and quickly and securely attached to a beam of a suspension assembly of the axle/suspension system.

Another objective of the disclosed subject matter is to provide an axle-to-beam connection for heavy-duty vehicle axle/suspension systems that provides a strong and secure connection between the axle and the beam, while eliminating line welds on the axle, thereby minimizing stress on the axle, and providing a stronger, more resilient axle-to-beam connection.

Yet another objective of the disclosed subject matter is to provide an axle-to-beam connection for heavy-duty vehicle axle/suspension systems that enables shipment of the axle and suspension assemblies of the axle/suspension system separately and facilitates quick and simplified on-site alignment and attachment of the axle to the beams of the suspension assemblies without the need for welding equipment.

Another objective of the disclosed subject matter is to provide an axle-to-beam connection for heavy-duty vehicle axle/suspension systems that provides improved field serviceability to the axle, beam, and/or components of the axle-to-beam connection.

Yet another objective of the disclosed subject matter is to provide an axle-to-beam connection for heavy-duty vehicle axle/suspension systems that includes a structure that acts as a mechanical bump stop to prevent potential damage to the beam, axle, frame of the heavy-duty vehicle, and/or components of the axle-to-beam connection during jounce events.

Another objective of the disclosed subject matter is to provide an axle-to-beam connection for heavy-duty vehicle axle/suspension systems that decreases manufacturing costs and complexity of the axle/suspension system.

These objectives and other are achieved by the axle-to-beam connection for heavy-duty vehicle axle/suspension systems of the disclosed subject matter, which includes: an axle; a beam including an alignment assembly; and an axle mount assembly, the axle mount assembly intimately contacting and capturing the axle, the axle being rigidly secured to the axle mount assembly without line welds, the axle mount assembly being removably connected to the alignment assembly to secure the axle to the beam.

BRIEF DESCRIPTION OF THE SEVERAL VIEWS OF THE DRAWINGS

The exemplary embodiment of the disclosed subject matter, illustrative of the best mode in which applicant has contemplated applying the principles, is set forth in the following description and is shown in the drawings.

Similar numerals and characters refer to similar components throughout the drawings.

DETAILED DESCRIPTION OF THE DISCLOSED SUBJECT MATTER

Figure 1:
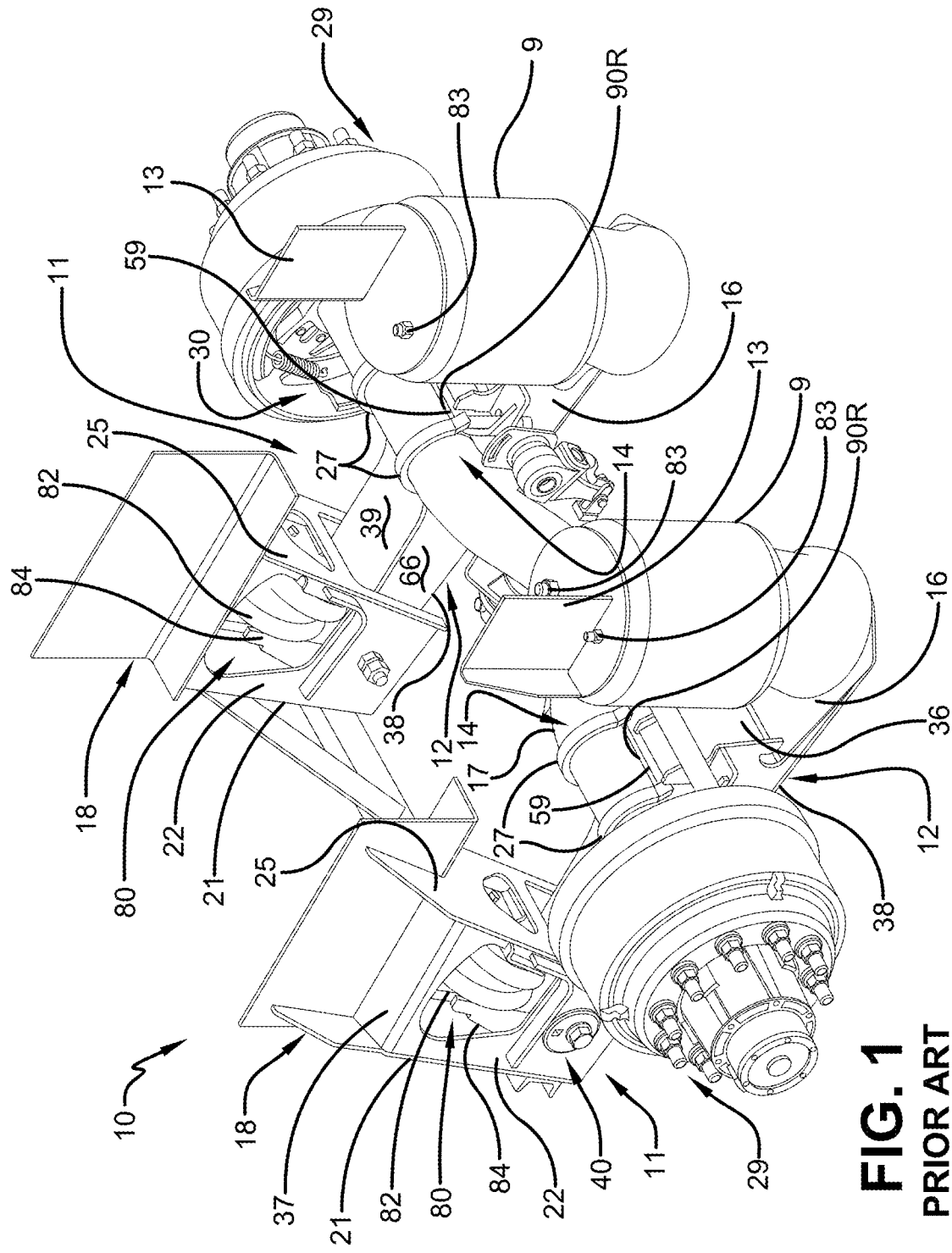
FIG. 1 is a top rear driver-side perspective view of a trailing arm beam-type axle/suspension system for a heavy-duty vehicle that includes a pair of suspension assemblies connected to the axle with prior art axle-to-beam connections.
Figure 2:
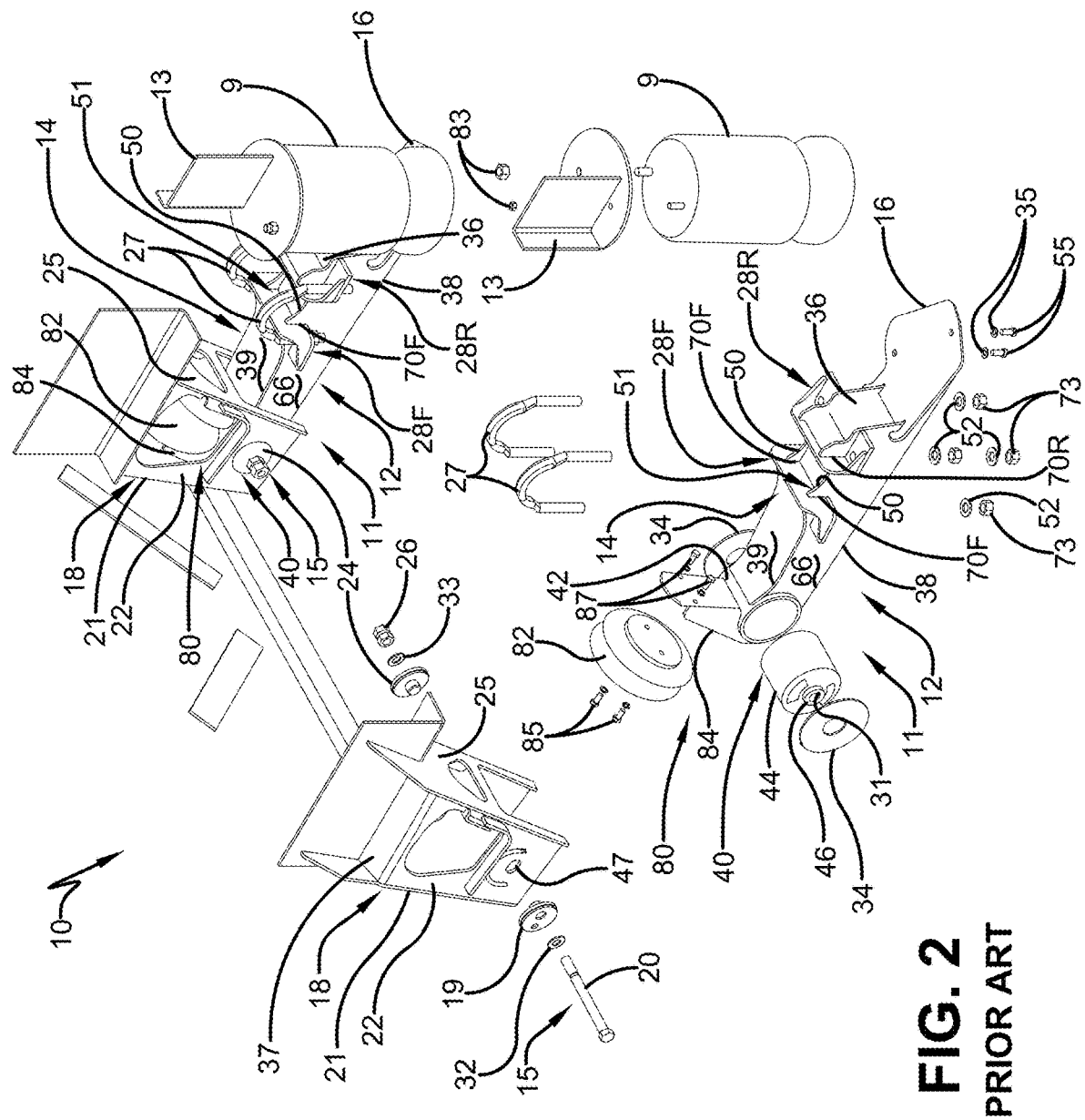
FIG. 2 is a perspective view of the axle/suspension system shown in FIG. 1 with the axle removed, showing the component parts of the suspension assembly, including the prior art axle-to-beam connection, in exploded view.
Figure 2A:
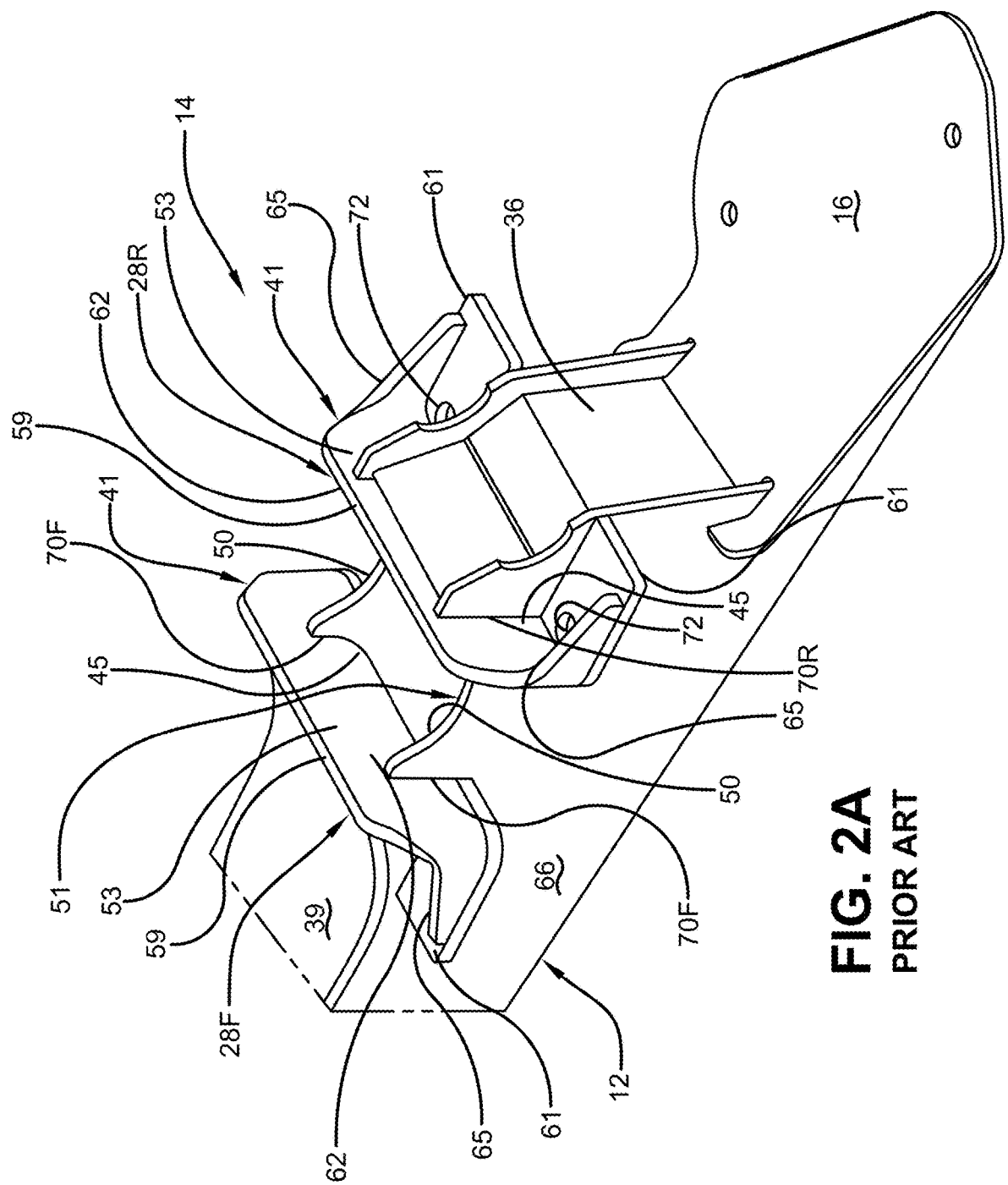
FIG. 2A is an enlarged fragmentary perspective view of a portion of the driver-side suspension assembly shown in FIGS. 1 and 2.
Figure 3:
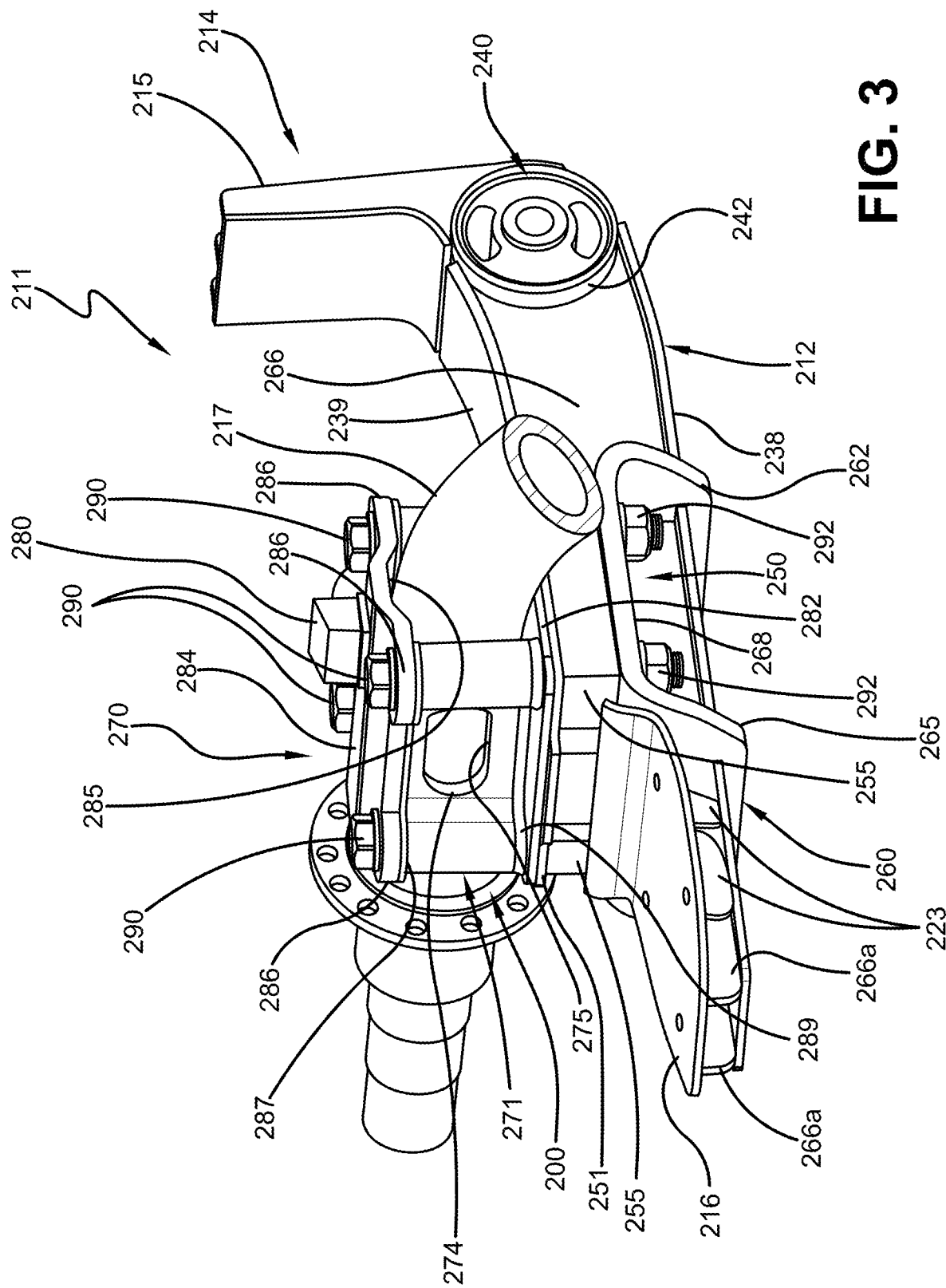
FIG. 3 is a top rear perspective view of a portion of a driver-side suspension assembly and a fragmentary portion of an axle of a trailing arm beam-type axle/suspension system for a heavy-duty vehicle connected to one another with an exemplary embodiment axle-to-beam connection for heavy-duty vehicle axle/suspension systems of the disclosed subject matter, a portion of the axle being shown in cross-section.

In order to better understand the environment in which the axle-to-beam connection for heavy-duty vehicle axle/suspension systems of the disclosed subject matter is utilized, a liftable trailing arm beam-type axle/suspension system 10 incorporating a pair of prior art axle-to-beam connections 14 is shown in FIGS. 1-2A. Axle/suspension system 10 includes a pair of transversely spaced mirror-image suspension assemblies 11 that depend from respective main members (not shown) of the heavy-duty vehicle (not shown). Inasmuch as suspension assemblies 11 are mirror-images of each other, only one of the suspension assemblies will be described in detail.

Suspension assembly 11 includes a beam 12 having a generally rigid metal box-like structure comprising a pair of transversely spaced vertical sidewalls 66. A bottom wall 38, a first top plate 39, and a second top plate 36 extend between and interconnect with sidewalls 66. Sidewalls 66 and bottom wall 38 are integrally formed as a single-piece that includes a generally U-shaped cross-sectional profile by stamping or bending. First top plate 39 and second top plate 36 are in a longitudinal spaced arrangement along beam 12 and are secured to sidewalls 66 via welding or other suitable means. Beam 12 also includes a mounting tube 42 formed of robust steel that is attached to the front ends of sidewalls 66, bottom wall 38, and first top plate 39.

Beam 12 includes a platform 16, which extends from the rear end of the beam and is rigidly attached to sidewalls 66 by suitable means, such as welding, adjacent second top plate 36 near the rear end of the beam. A conventional bellows-type air spring 9 is attached to and extends between platform 16 and a respective main member of the heavy-duty vehicle, as is known. In particular, air spring 9 has a mounting bracket 13 secured to the air spring by nuts 83. Mounting bracket 13 is secured to the main member with fasteners, as is known. Air spring 9 is secured to platform 16 with bolts 55 and washers 35. An axle 17 extends between and is rigidly connected to the rear end of each beam 12 utilizing components of prior art axle-to-beam connection 14, as will be described in greater detail below. For purposes of completeness, axle/suspension system 10 is also shown having a respective wheel end assembly 29 with a drum brake assembly 30 rotatably mounted on each end of axle 17.

Beam 12 is pivotally mounted by a bushing assembly 40 to a hanger 18, which depends from and is secured to a respective main member of the heavy-duty vehicle, as is known. Hanger 18 typically includes a generally box-like sturdy metal structure having a pair of transversely-spaced vertical sidewalls 22 extending between a front wall 21 and a rear wall 25. A top wall 37 extends between and is attached to front wall and rear wall 25. Bushing assembly 40 includes an elastomeric bushing 44 press fit into mounting tube 42 of beam 12. Bushing 44 is molded about and adhesively attached to a central metal sleeve 46 formed with an opening 31, which extends through the sleeve. Sleeve 46 extends completely through bushing 44 and protrudes outwardly from the bushing. Bushing assembly 40 includes a fastener assembly 15 having a bolt 20, which, together with a nut 26, is utilized to secure the components of the bushing assembly together and pivotally mount beam 12 to hanger 18. In particular, bolt 20 passes through a first washer 32, an eccentric washer 19 disposed adjacent the outboard sidewall 22 of hanger 18, an opening 47 formed in the outboard sidewall of the hanger, opening 31 of sleeve 46, an opening (not shown) formed in the inboard sidewall of the hanger, an inboard non-eccentric washer 24 disposed adjacent the inboard sidewall of the hanger, and a second washer 33 to receive nut 26. Eccentric washer 19 provides a means for adjusting alignment of axle/suspension system 10, as is known. In addition, a respective one of a pair of conventional spacer discs 34, formed of ultra-high molecular weight polyethylene, is disposed between bushing 44 and each sidewall 22 of hanger 18 to prevent contact between metal components of mounting tube 42 and the hanger. A shock absorber (not shown) may also be attached to and extend between beam 12 and the respective main member or hanger 18 of the heavy-duty vehicle, as is known.

Suspension assembly 11 also includes a lift assembly 80, which enables beam 12, with axle 17, to be lifted and maintained in a raised position by prior art axle-to-beam connection 14 during certain heavy-duty vehicle operations. Lift assembly 80 generally includes an elastomeric bellows-type air chamber 82 and a lift arm 84. Lift arm 84 is rigidly attached to mounting tube 42 of beam 12, such as by welding, and extends upwardly into hanger 18. The front end of air chamber 82 is attached to the rear surface of lift arm 84 by fasteners 85. The rear end of air chamber 82 is attached to the front surface of rear wall 25 of hanger 18 by fasteners 87. As air from an air supply source (not shown) installed on the heavy-duty vehicle is introduced into air chamber 82, and as air is simultaneously released from air spring 9, the air chamber expands away from rear wall 25 of hanger 18 and applies a frontward force on lift arm 84. This frontward force causes arcuate upward movement of beam 12 about bushing assembly 40 that enables suspension assembly 11, axle 17, and wheel end assembly 29 rotatably mounted on the axle to be lifted and maintained in a raised position.

As described above, axle 17 is connected to suspension assembly 11 utilizing prior art axle-to-beam connection 14. Prior art axle-to-beam connection 14 generally includes a front U-bolt bracket/axle seat 28F and a rear U-bolt bracket/axle seat 28R connected to or integrated into beam 12. With particular reference to FIGS. 2-2A, both front and rear U-bolt brackets/axle seats 28F and 28R include a generally vertical interconnecting member 41, a generally horizontal member 61, and a strengthening web 65. Interconnecting member 41 includes a lower portion 45, an upper portion 53 with a terminal edge 59, and a surface 62. Each horizontal member 61 includes a pair of openings 72, each of which is formed through the inboard and outboard side of the respective horizontal member. Lower portion 45 of front U-bolt bracket/axle seat 28F nests in a pair of transversely-spaced front slots 70F formed in sidewalls 66 of beam 12 adjacent the rear end of first top plate 39. Lower portion 45 of front U-bolt bracket/axle seat 28F extends downwardly adjacent to the front portion of axle 17, such that surface 62 faces the front portion of the axle, and is rigidly secured to beam 12 using suitable means, such as welding. Similarly, lower portion 45 of rear U-bolt bracket/axle seat 28R nests in a pair of transversely-spaced rear slots 70R formed in sidewalls 66 of beam 12 spaced a longitudinal distance from front slots 70F and adjacent the front end of second top plate 36. Lower portion 45 of U-bolt bracket/axle seat 28R extends downwardly toward and adjacent to the rear portion of axle 17, such that surface 62 faces the rear portion of the axle, and is rigidly secured to beam 12 using suitable means, such as welding. The upper edges of sidewalls 66 of beam 12 are each integrally formed with an arch 50 between front and rear slots 70F and 70R. U-bolt bracket/axle seats 28F and 28R, together with arches 50, form an axle locus 51, which is generally known or referred to as an axle seat.

Prior art axle-to-beam connection 14 requires a pair of generally identical inboard and outboard connections for attaching axle 17 to beam 12 of the respective suspension assembly 11. This is typically accomplished by a pair of U-bolts 27. Each U-bolt 27 is disposed about axle 17 and through openings 72 of front and rear U-bolt brackets/axle seats 28F and 28R, respectively. A washer 52 (FIG. 2) is disposed over each of a respective one of a pair of threaded ends of each U-bolt 27. A nut 73 threadably engages each one of the pair of ends of each U-bolt 27 and is tightened to secure axle 17 into axle locus 51 of beam 12.

In addition, axle 17 is also irremovably attached to front and rear U-bolt bracket/axle seats 28F and 28R by a front line weld (not shown) and a rear line weld 90R (FIG. 1). The front line weld is formed along the interface between terminal edge 59 of upper portion 53 of interconnecting member 41 of front U-bolt bracket/axle seat 28F and axle 17 at or just beyond the horizontal centerline of the axle. Similarly, rear line weld 90R is formed along the interface between terminal edge 59 of upper portion 53 of interconnecting member 41 of rear U-bolt bracket/axle seat 28R and axle 17 at or just beyond the horizontal centerline of the axle. Together, U-bolts 27, the front line weld, and rear line weld 90R rigidly attach axle 17 to beam 12 of suspension assembly 11 to complete prior art axle-to-beam connection 14.

Prior art axle-to-beam connection 14, while adequately securing axle 17 to beam 12 of suspension assembly 11, has certain disadvantages, drawbacks, and limitations. For example, during heavy-duty vehicle operation under harsh driving conditions, such as on harsh road surfaces, axle-to-beam connection 14 potentially has reduced fatigue strength and durability. In particular, the starting and the termination points of the front line weld and rear line weld 90R on axle 17 create stress risers on or near axle-to-beam connection 14. These stress risers can potentially compromise axle-to-beam connection 14 and axle 17 during heavy-duty vehicle operation under harsh driving conditions due to forces imposed on the axle-to-beam connection, and can potentially cause failure of the line welds. More particularly, during heavy-duty vehicle operation certain forces are imparted from beam 12 substantially through the front line weld and rear line weld 90R to axle 17, which may potentially result in failure of axle-to-beam connection 14, thereby increasing heavy-duty vehicle downtime and repair cost.

In addition, because axle 17 is irremovably connected to beam 12 of suspension assembly 11 during manufacturing, axle/suspension system 10 must be shipped with the axle attached to the beams of the suspension assemblies, increasing the cost of and amount of space required for shipments as compared to separately shipping the axles and the suspension assemblies. Furthermore, as prior art axle-to-beam connection 14 utilizes the front line weld and rear line weld 90R to irremovably attach axle 17 to front and rear U-bolt bracket/axle seats 28F and 28R, and thus attach the axle to beam 12, if the axle, beam, and/or components of the axle-to-beam connection become damaged during operation of the heavy-duty vehicle, servicing or replacement of such components in the field may be difficult or impossible. More specifically, in order to service or replace axle 17, beam 12, and/or components of axle-to-beam connection 14, the front line weld and rear line weld 90R may have to be removed prior to servicing or replacement of the component(s), and the axle subsequently rewelded to front and rear U-bolt bracket/axle seats 28F and 28R to reattach axle 217 to beam 212 after servicing or replacement of the component(s), which can be difficult to perform in the field and typically requires specialized equipment that the vehicle operator and/or service technician may not have access to in the field. Moreover, suspension assemblies 11 require bump stops, or other discrete components to protect contact between and potential damage to prior art axle-to-beam connections 14, axle 17, and/or the main members of the heavy-duty vehicle during jounce events, which undesirably increases the weight, manufacturing cost, and complexity of axle/suspension system 10. The axle-to-beam connection of the disclosed subject matter overcomes the disadvantages, drawbacks, and limitations associated with prior art axle-to-beam connections, such as prior art axle-to-beam connection 14, and provides additional benefits, and will now be described.

An exemplary embodiment axle-to-beam connection for heavy-duty vehicle axle/suspension systems of the disclosed subject matter is shown in FIGS. 3-10 and is indicated generally at 200. Exemplary embodiment axle-to-beam connection 200 is shown employed with a suspension assembly 211 and an axle 217 of a liftable trailing arm beam-type axle/suspension system (not shown) for a heavy-duty vehicle similar in structure and function to axle/suspension system 10 (FIGS. 1-2A) described above. The axle/suspension system includes a pair of transversely-spaced mirror-image suspension assemblies 211 depending from respective main members (not shown) of a frame (not shown) of the heavy-duty vehicle (not shown). Axle 217 extends transversely between and is rigidly connected to each suspension assembly 211 utilizing a respective exemplary embodiment axle-to-beam connection 200, which will be described in detail below. Inasmuch as suspension assemblies 211 are mirror images of each other, for purposes of conciseness and clarity, only one of the suspension assemblies will be described in detail.

Suspension assembly 211 includes beam 212, which is a generally rigid metal box-like structure. With reference to FIGS. 3-5 and 8-10, beam 212 generally comprises a pair of transversely spaced vertical sidewalls 266 interconnected by a longitudinally-extending top plate 239 and a longitudinally-extending bottom plate 238. Bottom plate 238 is rigidly attached to the bottom edges of sidewalls 266 by any suitable means, such as welding, and extends slightly inboardly and outboardly from the sidewalls. Top plate 239 is rigidly attached to the top edges of sidewalls 266 by any suitable means, such as welding. Beam 212 includes a mounting tube 242 (FIGS. 3-5, 8, and 10) formed of a suitably robust material, such as steel. Mounting tube 242 is rigidly attached to the front ends of sidewalls 266, top plate 239, and bottom plate 238 via suitable means, such as welding. Beam 212 is pivotally attached to a hanger (not shown), such as hanger 18 (FIGS. 1-2) described above, via a bushing assembly 240 disposed within mounting tube 242. The hanger depends from and is secured to the main member of the heavy-duty vehicle by any suitable means, such as welding or fasteners.

Beam 212 includes a platform 216, which is rigidly attached to a pair of rearwardly extending beam extensions 266a integrally formed with sidewalls 266 near the rear end of the beam via suitable means, such as welding. Beam 212 also includes at least one, but, more preferably, a pair of gussets 223 (FIGS. 3-5 and 8-10), which provide support to platform 216. In particular, gussets 223 are attached between the bottom surface of platform 216 and the top surface of bottom plate 238, and extend inboardly from the inboard surface of the outboard beam extension 266a through a slot (not shown) formed in the inboard beam extension 266a to a location adjacent the inboard edge of platform 216. Platform 216 supports a conventional bellows-type air spring (not shown), which is attached to and extends between the platform and a respective main member of the frame of the heavy-duty vehicle.

Beam 212 is connected to a lift assembly 214 (FIGS. 3-5, 8 and 10; partially shown) that is similar in structure and function to lift assembly 80 (FIGS. 1-2) described above. Lift assembly 214 enables beam 212 and axle 217, attached to the beam via exemplary embodiment axle-to-beam connection 200 in a manner described below, to be lifted and maintained in a raised position during certain heavy-duty vehicle operations. Lift assembly 214 generally includes an elastomeric bellows-type air chamber (not shown) and a lift arm 215. Lift arm 215 is rigidly attached, such as by welding, to mounting tube 242 of beam 212 and extends upwardly into the hanger to which the beam is pivotally connected. The front end of the air chamber is attached to the rear surface of lift arm 215 via fasteners (not shown). The rear end of the air chamber is attached to the front surface of a rear wall (not shown) of the hanger by fasteners (not shown). As air from an air supply source (not shown) installed on the heavy-duty vehicle is introduced into the air chamber, and air is simultaneously released from the air spring, the air chamber expands away from a rear wall (not shown) of the hanger, applying force to lift arm 215 and causing arcuate upward movement of beam 212 about bushing assembly 240, thereby enabling the axle/suspension system, axle 217, and wheels (not shown) attached to the axle to be lifted and maintained in a raised position.

In accordance with an important aspect of the disclosed subject matter, exemplary embodiment axle-to-beam connection 200 includes a structure that enables axle 217 to be accurately aligned with beam 212 of suspension assembly 211 and quickly and securely attached to the beam. More specifically, axle-to-beam connection 200 comprises a two-part connection, which generally includes an axle alignment assembly 250 and an axle mount assembly 270. With reference to FIGS. 3-5 and 8-10, axle alignment assembly 250 is rigidly connected/integrated into beam 212 of suspension assembly 211. Alignment assembly 250 includes a mounting plate 251 integrally formed with the rear end of top plate 239 of beam 212. Mounting plate 251 is positioned adjacent the rear end of sidewalls 266 of beam 212 and is rigidly attached to the top edges of the sidewalls via suitable means, such as welding. Mounting plate 251 extends inboardly and outboardly from sidewalls 266 and is formed with a plurality of openings 254 (FIGS. 8-9), with two openings being positioned longitudinally from one another adjacent the inboard end of the mounting plate and two openings being positioned longitudinally from one another adjacent the outboard end of the mounting plate, the importance of which will be described in detail below. It is to be understood that although mounting plate 251 is shown integrally formed with top plate 239 of beam 212, it is contemplated that the mounting plate could be a discrete structure that is welded or otherwise rigidly attached to the top plate and/or sidewalls 266 of the beam without affecting the overall concept or operation of the disclosed subject matter.

With reference to FIGS. 3-5 and 8-10, axle alignment assembly 250 further includes an attachment bracket 260 to accommodate mounting and/or attachment of other components of exemplary embodiment axle-to-beam connection 200 to beam 212, as will also be described in greater detail below. Attachment bracket 260 has a generally C-shaped structure that includes a front plate 262, a rear plate 265, and a pair of bolt brackets 268. Rear plate 265 is disposed about the rear end of sidewalls 266 and bottom plate 238 of beam 212 and is attached to the sidewalls and bottom plate via suitable means, such as welding. Front plate 262 is also disposed about sidewalls 266 and bottom plate 238 of beam 212 and is spaced a longitudinal distance frontward of rear plate 265 near the longitudinal midpoint of the beam. Front plate 262 is attached to sidewalls 266 and bottom plate 238 of beam 212 via suitable means, such as welding. Each of rear plate 265 and front plate 262 extend axially inboardly and outwardly from the respective inboard and outboard surfaces of the inboard and outboard sidewalls 266 of beam 212.

Each bolt bracket 268 is integrally formed with front plate 262 and rear plate 265 and extends longitudinally between the front plate and rear plate adjacent a respective inboard and outboard surface of the inboard and outboard sidewalls 266 of beam 212. Each bolt bracket 268 is rigidly attached to the respective inboard and outboard surface of the inboard and outboard sidewalls 266 via suitable means, such as welding. Each bolt bracket 268 is formed with a pair of longitudinally spaced openings (not shown), the importance of which will be described below. With continued reference to FIGS. 3-5 and 8-10, alignment assembly 250 further includes a pair of spacers 255. Each one of spacers 255 is positioned between the bottom of mounting plate 251 and the top of a respective bolt bracket 268 of attachment bracket 260 inboardly or outboardly of a respective inboard or outboard sidewall 266 of beam 212 and is rigidly connected thereto via suitable means, such as welding. Each spacer 255 is formed with a pair of longitudinally spaced openings (not shown) that align with respective openings formed in mounting plate 251 and bolt bracket 268 of attachment bracket 260, the importance of which will be described below. It is to be understood that axle alignment assembly 250 of axle-to-beam connection 200 could have different structures than those shown, such as having different forms and/or including different components, without affecting the overall concept or operation of the disclosed subject matter.

With particular reference to FIGS. 3-7 and 9-10, axle mount assembly 270 of exemplary embodiment axle-to-beam connection 200 includes a multi-component structure that is utilized to capture and secure axle 217 of the axle/suspension system to axle alignment assembly 250, and thus secure the axle to beam 212 of suspension assembly 211 of the axle/suspension system. More specifically, mount assembly 270 includes a pair of axle support brackets 271 positioned on and attached to respective front and rear sides of axle 217. Inasmuch as support brackets 271 are identical in structure and function to one another, for purposes of conciseness and clarity, only one of the axle support brackets will be described in detail.

Figure 4:
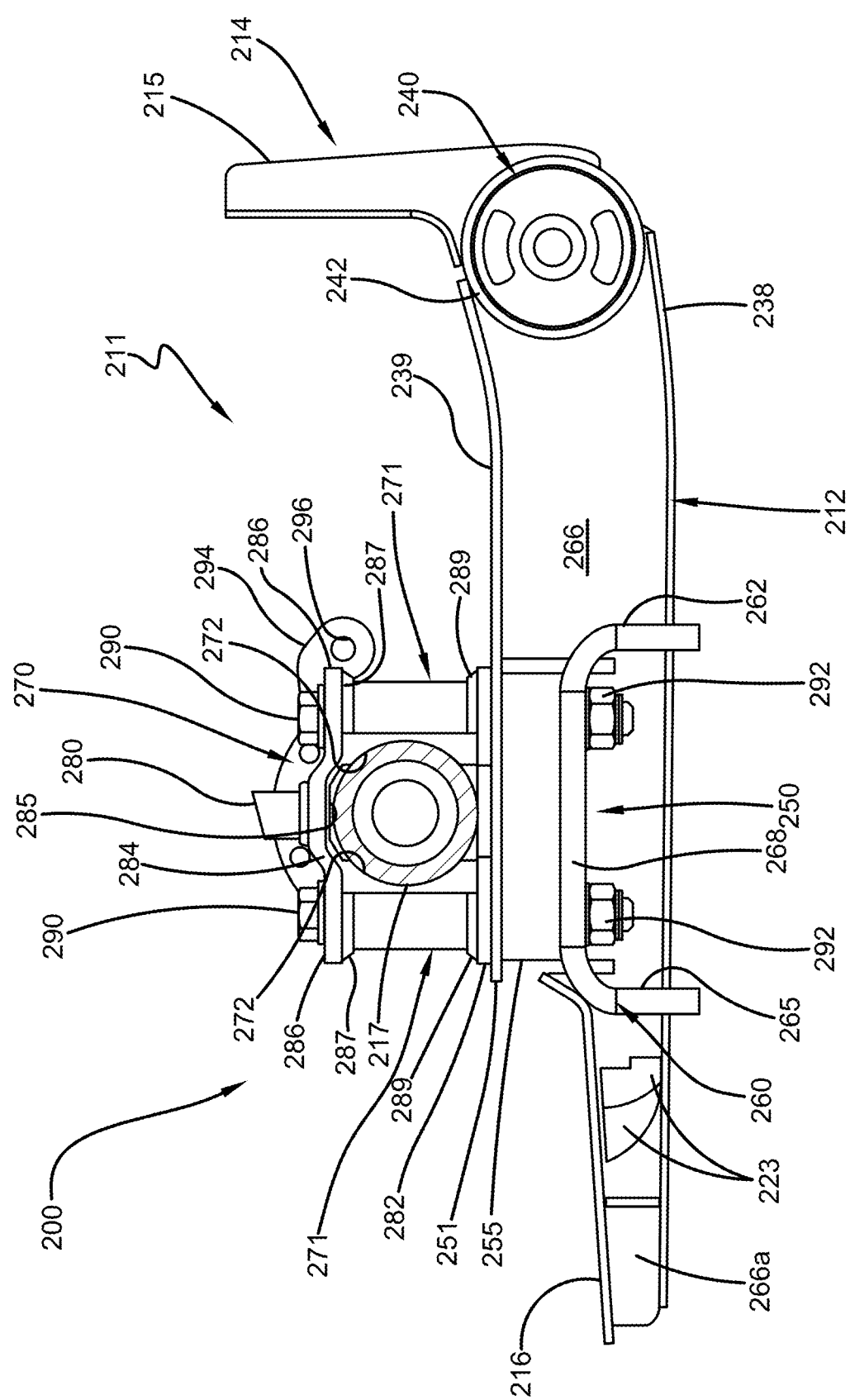
FIG. 4 is an elevational view of the suspension assembly, axle, and exemplary embodiment axle-to-beam connection of the disclosed subject matter shown in FIG. 3 with the axle in section, viewed looking in an outboard direction.
Figure 5:
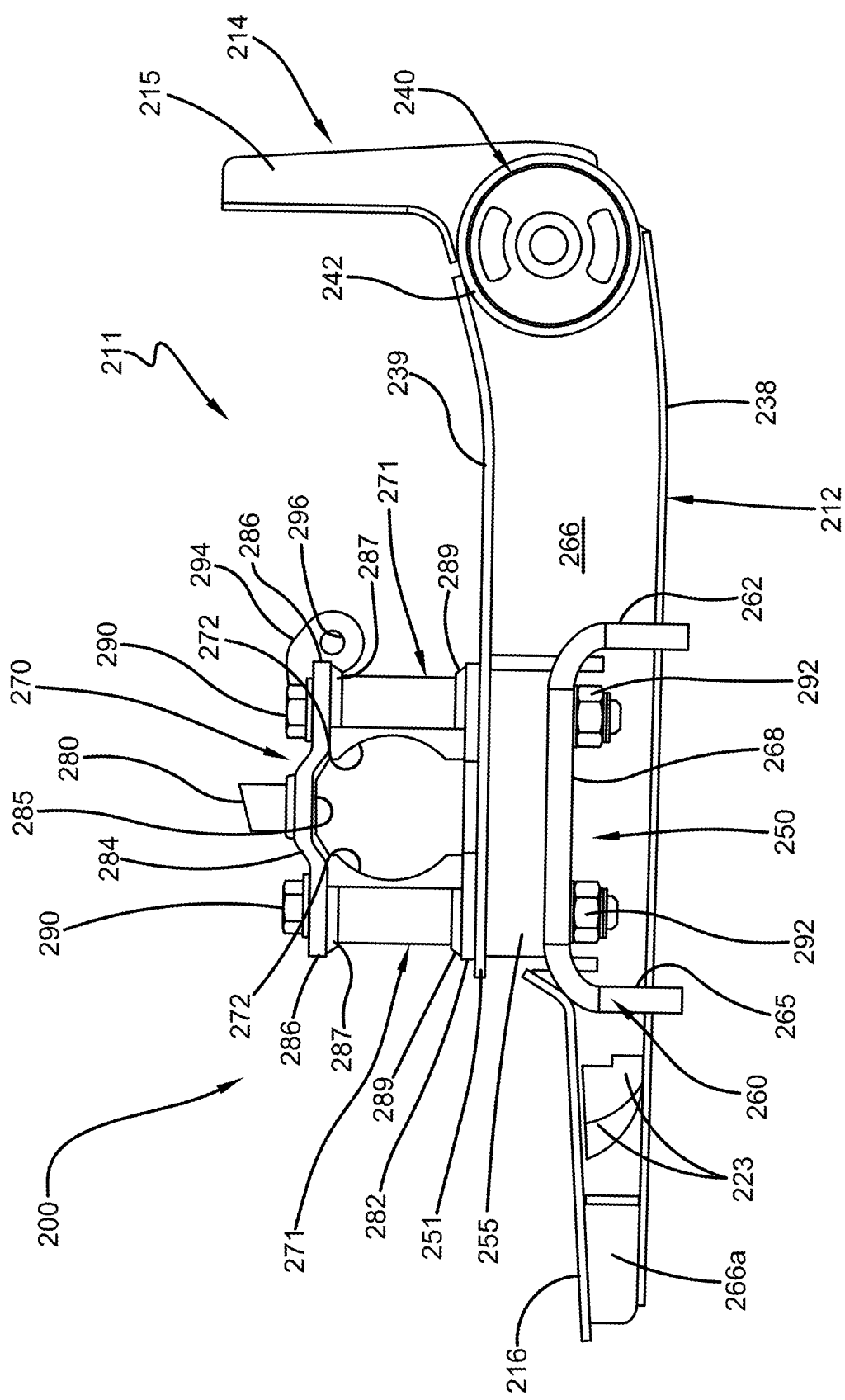
FIG. 5 is an elevational view similar to FIG. 4, showing the axle removed and showing the profiles of axle contact surfaces of the axle support brackets of the exemplary embodiment axle-to-beam connection of the disclosed subject matter.
Figure 6:
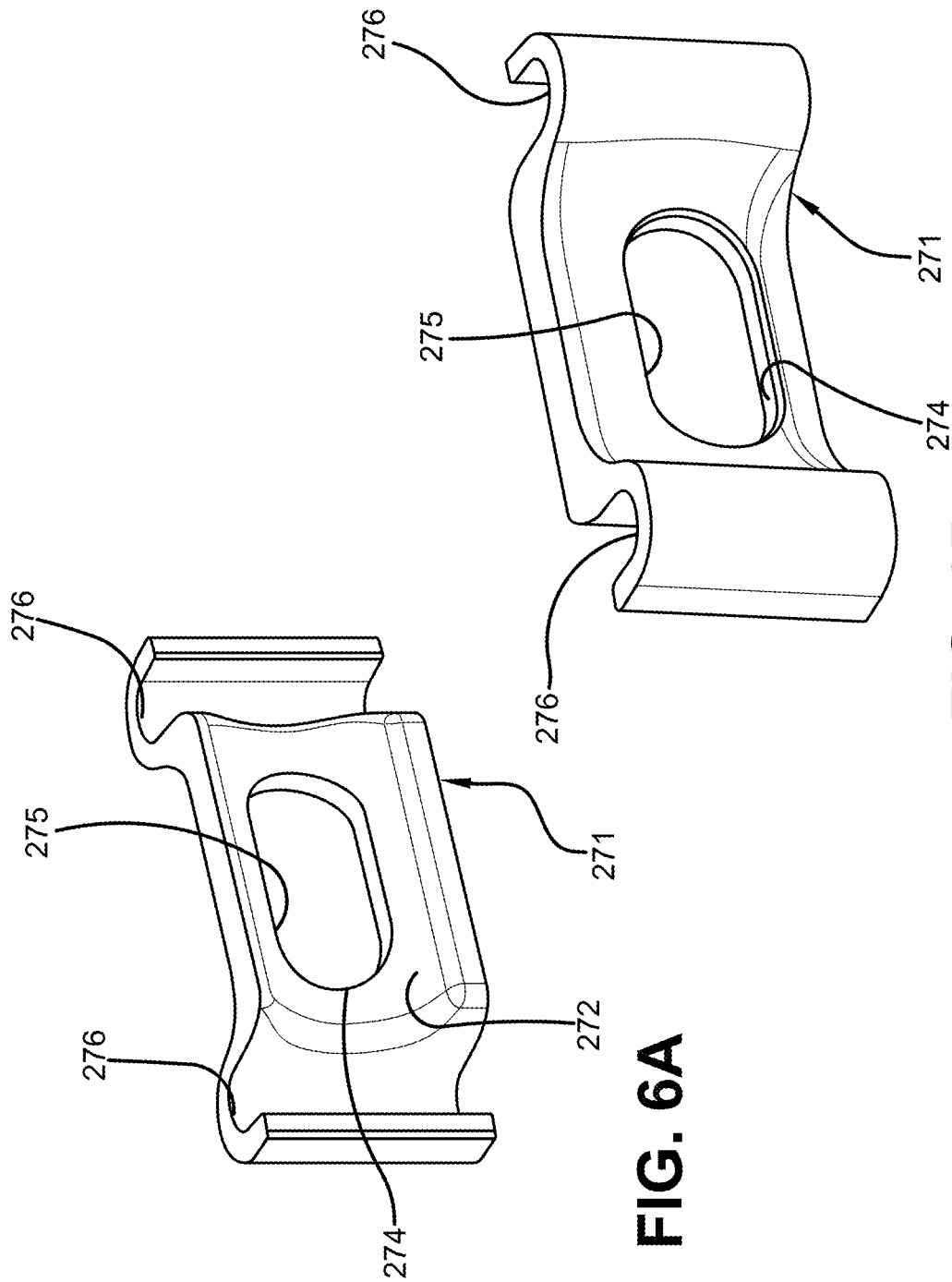
FIG. 6A is a perspective view of one of the axle support brackets of the exemplary embodiment axle-to-beam connection of the disclosed subject matter shown in FIG. 3, showing the concave axle contact surface of the axle support bracket.
FIG. 6B is an enlarged top perspective view of the axle support bracket shown in FIG. 6A, viewed in an opposite direction.
Figure 7:
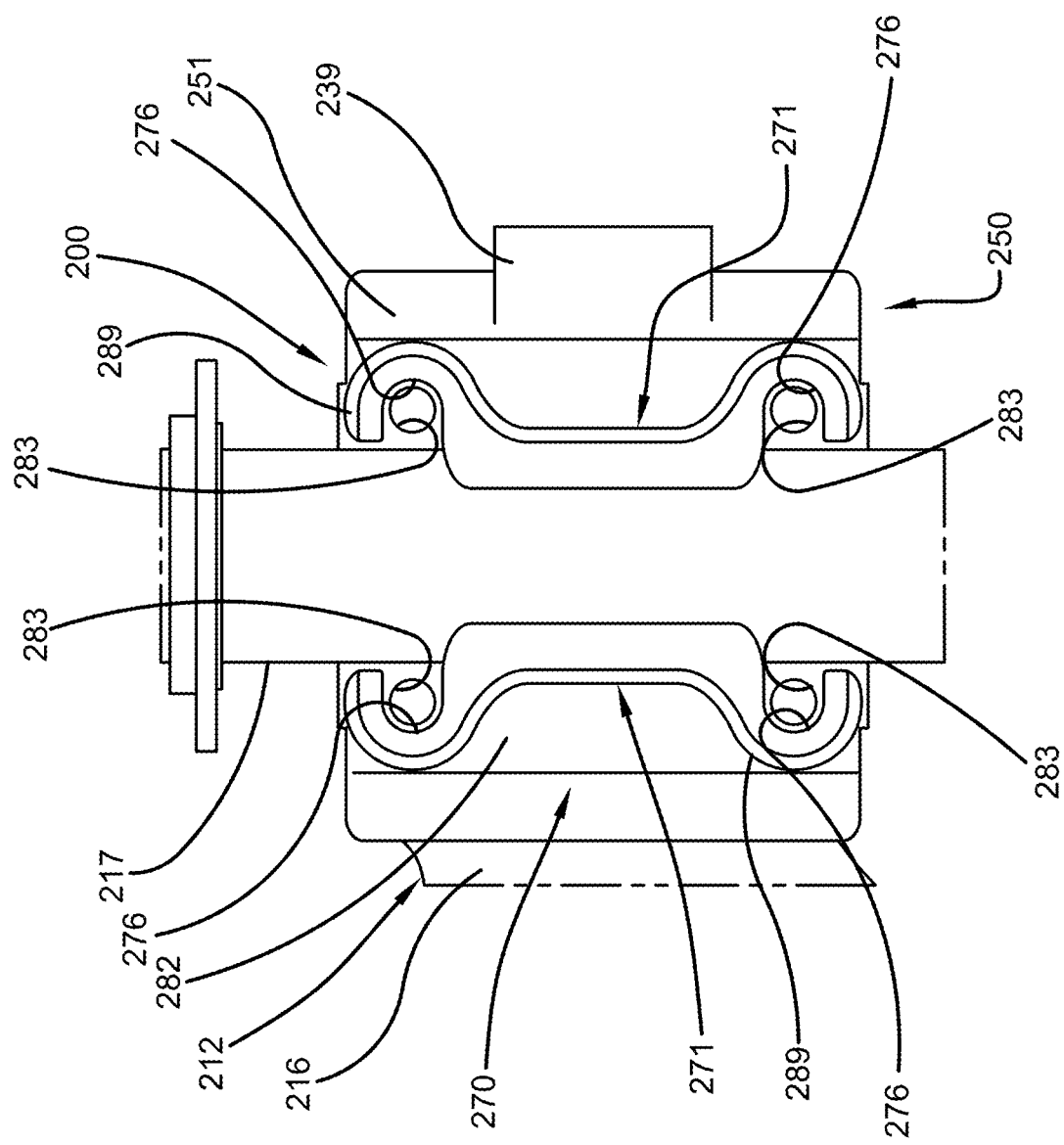
FIG. 7 is a fragmentary enlarged top plan view of a portion of the suspension assembly and axle connected thereto via the exemplary embodiment axle-to-beam connection of the disclosed subject matter shown in FIG. 3, with a top plate of an axle mount assembly and bolts of the exemplary embodiment axle-to-beam connection removed.
Figure 8:
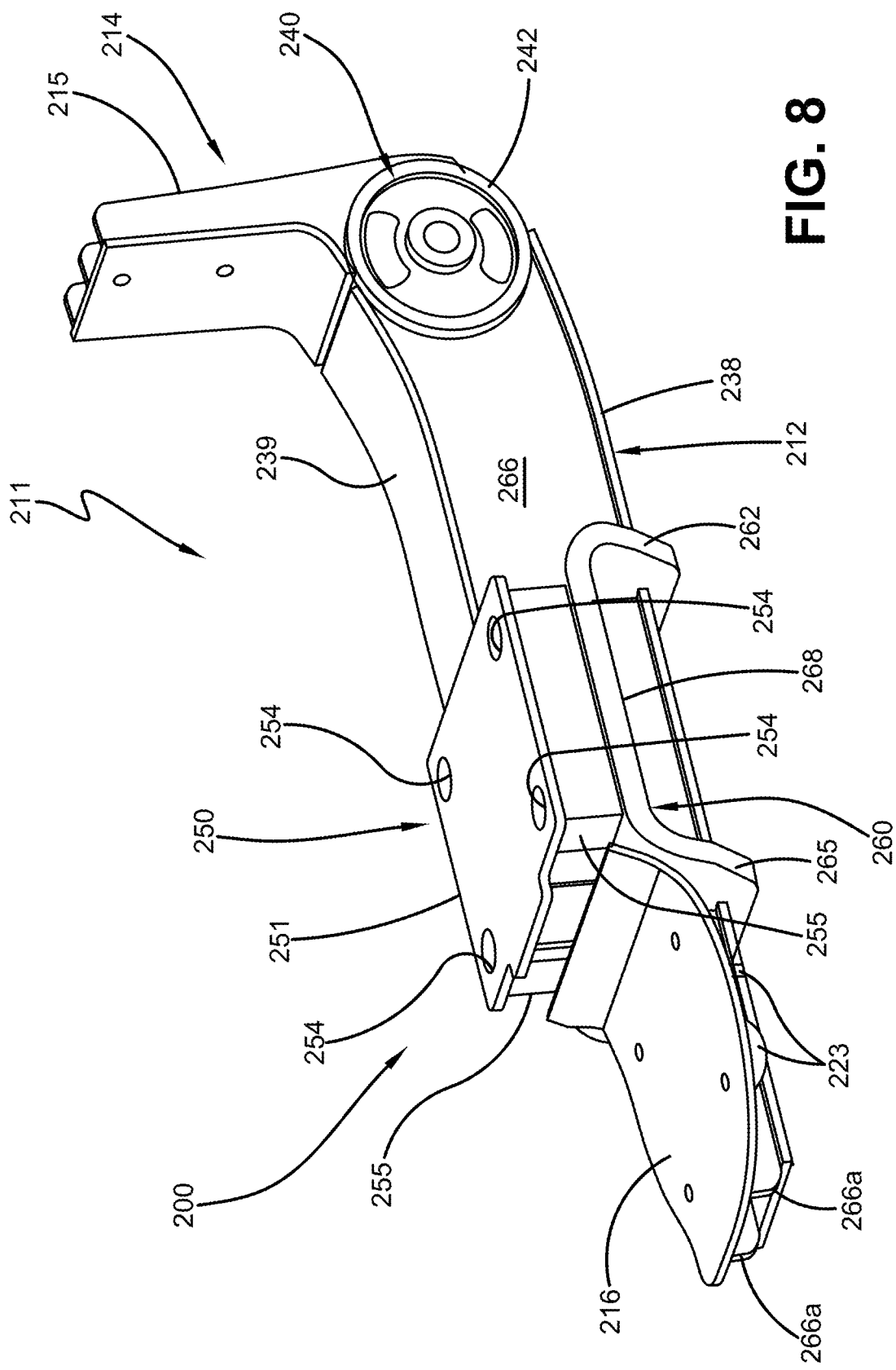
FIG. 8 is top rear perspective view of the suspension assembly and a portion of the exemplary embodiment axle-to-beam connection shown in FIG. 3, with the axle of the axle/suspension system and the axle mount assembly and bolts of the exemplary embodiment axle-to-beam connection removed and showing an axle alignment assembly of the exemplary embodiment axle-to-beam connection attached to/integrated into the suspension assembly.
Figure 9:
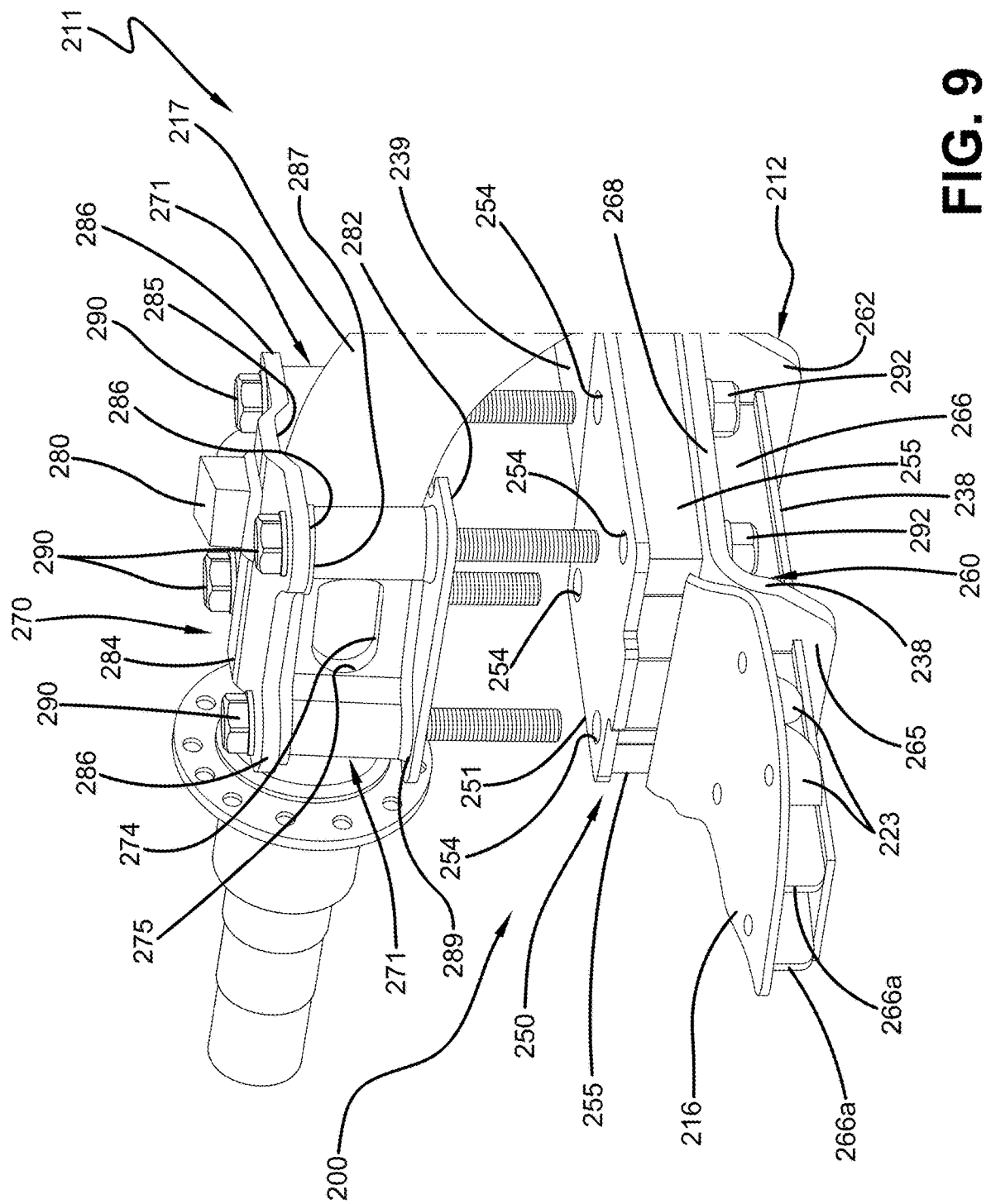
FIG. 9 is a fragmentary top rear perspective view of a portion of the suspension assembly, the axle, and the exemplary embodiment axle-to-beam connection shown in FIG. 3, showing the axle mount assembly and the axle alignment assembly of the exemplary embodiment axle-to-beam connection disconnected from one another.

Axle support bracket 271 is formed of a suitable rigid material, such as steel, and includes a generally elongated structure. With particular reference to FIGS. 6A, 6B, and 7, support bracket 271 is formed with a pair of vertically-extending elongated slotted openings 276 located at opposite inboard and outboard ends of the bracket. With reference to FIGS. 4-5, 6A, 6B, and 7, support bracket 271 is formed with an axially-extending axle contact recess 272. As best shown in FIGS. 4-5, axle contact recess 272 includes a generally concave profile that corresponds and is complementary to the convex profile of the front and/or rear of axle 217, thereby facilitating close or intimate contact between support bracket 271 and the axle when the support bracket is positioned against the axle. Support bracket 271 is formed with a window 274 that extends axially between slotted openings 276 and is defined by a continuous elongated circular, obround, oblong, or oval-shaped continuous inner edge 275. Support bracket 271 is attached to axle 217 via window 274. More specifically, the continuous nature of inner edge 275 of window 274 allows a continuous window weld (not shown) to attach support bracket 271 to axle 217. More particularly, the continuous window weld begins at a point along inner edge 275 of window 274 and is continuously produced around the inner edge; and terminates at the point at which the continuous window weld was initiated. As a result, the continuous window weld has no gaps and lacks separate starting and termination points due to the continuous nature and curved shape of inner edge 275 of window 274, thereby completely attaching the entirety of the inner edge to axle 217.

Figure 10:
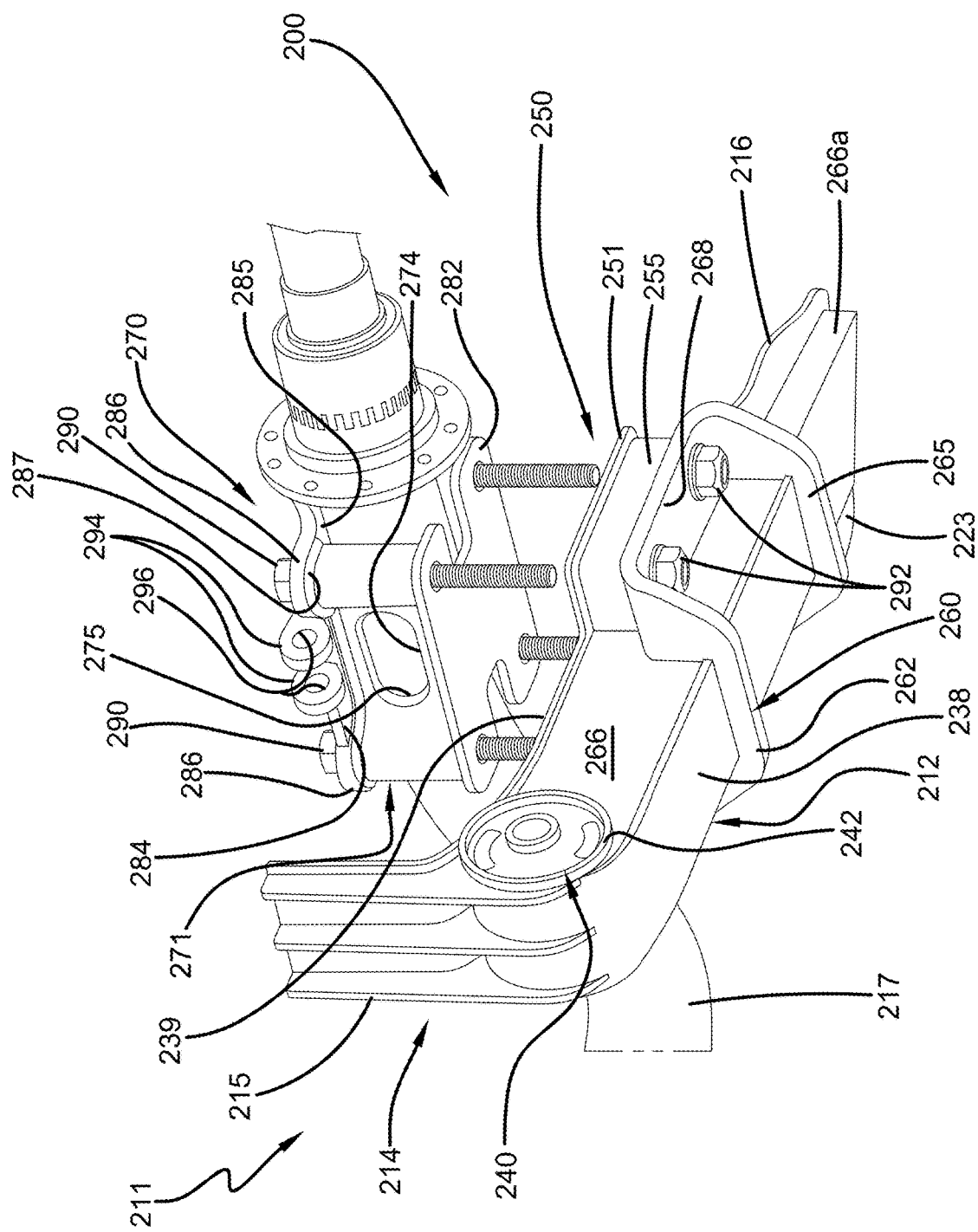
FIG. 10 is a fragmentary bottom front perspective view of a portion of the suspension assembly, the axle, and the exemplary embodiment axle-to-beam connection shown in FIG. 3, showing the axle mount assembly and the axle alignment assembly of the exemplary embodiment axle-to-beam connection disconnected from one another.

With reference to FIGS. 3-5 and 9-10, axle mount assembly 270 further includes a top plate 284. Top plate 284 includes a generally flat structure and is formed of a suitable rigid material, such as steel. Top plate 284 includes an axially-extending recess 285 that corresponds generally to the convex profile of the top of axle 217. Top plate 284 is formed with four bosses 286, each one of which is formed with an opening (not shown), the importance of which will be described below. Top plate 284 is positioned on top of axle support brackets 271 such that axle 217 is positioned within recess 285 of the top plate and the openings formed in bosses 286 align with elongated slotted openings 276 of the axle support brackets. Top plate 284 is rigidly attached to the top edge of each support bracket 271 via a weld 287 laid between the top edge of each support bracket and the bottom surface of the top plate. With reference to FIGS. 4-5 and 10, top plate 284 further includes a pair of shock absorber mounting brackets 294 secured thereto via suitable means, such as welding. Each of shock absorber mounting brackets 294 is formed with a respective one of a pair of transversely aligned openings 296. Openings 296 enable a shock absorber (not shown) to be mounted and secured to axle mount assembly 270 via suitable means, such as a fastener. The shock absorber in turn is attached to the hanger or the main member of the frame of the heavy-duty vehicle via suitable means, such as a fastener(s).

With reference to FIGS. 3-5, 7, and 9-10, axle mount assembly 270 further includes a bottom plate 282 that includes a generally flat H-shaped structure formed of a suitable rigid material, such as steel. With reference to FIG. 7, bottom plate 282 is formed with four openings 283, with each of the openings being formed in a respective leg of the H-shaped structure of the bottom plate. Bottom plate 282 is positioned below axle 217 and axle support brackets 271 such that openings 283 of the bottom plate are aligned with elongated slotted openings 276 of the axle support brackets and the openings formed in top plate 284. With reference to FIGS. 3-5, 7, and 9, bottom plate 282 is rigidly attached to the bottom edge of each support bracket 271 via a weld 289 laid between the bottom edge of each support bracket and the top surface of the bottom plate. With particular reference to FIG. 7, because support brackets 271 are connected to axle 217 in the manner described above and include slotted openings 276, the axle can include varying outer diameters while maintaining vertical alignment of the openings formed in top plate 284, the slotted openings, and openings 282 of bottom plate 282 upon attachment of the top plate and bottom plate to the support brackets via welds 287 and 289, respectively, the importance of which will be described below.

As axle support brackets 271 are rigidly secured to the front and rear of axle 217, and top plate 284 and bottom plate 282 are rigidly secured to the axle support brackets in the manner described above, axle 217 is effectively captured by and secured to axle mount assembly 270 of exemplary embodiment axle-to-beam connection 200. It is to be understood that axle mount assembly 270 of axle-to-beam connection 200 could have different structures than those shown, such as having different forms and/or including different components, without affecting the overall concept or operation of the disclosed subject matter.

With reference to FIGS. 3-4, 7, and 9-10, openings 283 of bottom plate 282 of axle mount assembly 270 align vertically with respective openings 254 of mounting plate 251 of axle alignment assembly 250, as well as align vertically with respective elongated slotted openings 276 of axle support brackets 271 and the openings formed in bosses 286 of top plate 284. Bolts 290 (FIGS. 3-5 and 9-10) are disposed through the openings formed in bosses 286 of top plate 284, slotted openings 276 of support brackets 271, and openings 283 of bottom plate 282 of mount assembly 270, and through openings 254 of mounting plate 251, the openings in spacers 255, and the openings (not shown) of bolt brackets 268 of attachment brackets 260 of alignment assembly 250. Nuts 292 are tightened on respective bolts 209, thereby securing mount assembly 270 and alignment assembly 250 of exemplary embodiment axle-to-beam connection 200 together, and thus securing axle 217 captured by and secured to the mount assembly to beam 212 of suspension assembly 211 of the axle/suspension system in substantially perpendicular alignment with the longitudinal length of the beam. In this manner, exemplary embodiment axle-to-beam connection 200 enables axle 217 to be accurately aligned with beam 212 of suspension assembly 211 and quickly and securely attached to the beam.

In accordance with another important aspect of the disclosed subject matter, exemplary embodiment axle-to-beam connection 200 provides a strong and secure connection between axle 217 and beam 212. More specifically, as a continuous weld is laid between inner edge 275 of window 274 of each axle support bracket 271 of axle mount assembly 270 and axle 217 to secure the axle to the axle mount assembly, line welds on the axle are eliminated, which eliminates or greatly reduces the formation of stress risers, providing a generally stronger and more resilient connection capable of effectively reacting torsional and roll forces imparted on axle-to-beam connection 200 compared to prior art axle-to-beam connections that utilize line welds to attach the axle to the beam, such as axle-to-beam connection 14 described above. In addition, as support brackets 271 of axle mount assembly 270 intimately contact axle 217, and thus extend transversely along and partially encompasses the axle both inboardly and outboardly from the continuous weld at inner edge 275 of window 274, the axle mount assembly effectively reacts vertical, lateral, and longitudinal forces imparted on axle-to-beam connection 200 during operation of the heavy-duty vehicle, thereby reducing stress on the continuous weld and further strengthening the axle-to-beam connection. Furthermore, because axle alignment assembly 250 is attached to/integrated into beam 212, axle 217 is captured by and secured to mount assembly 270, and the axle mount assembly is secured to the axle alignment assembly via bolts 290 and nuts 292, loads imparted on axle-to-beam connection 200 are transferred throughout the structure of the beam, providing additional torsional stiffness to, and reducing stress on, the axle-to-beam connection. In this manner, exemplary embodiment axle-to-beam connection 200 provides a stronger, more resilient and secure connection capable of withstanding forces imparted on the axle-to-beam connection during operation of the heavy-duty vehicle in harsh driving conditions, such as on harsh road surfaces.

In accordance with yet another important aspect of the disclosed subject matter, exemplary embodiment axle-to-beam connection 200 enables removable attachment of axle 217 to beam 212 of suspension assembly 211. More specifically, because axle 217 is captured by and secured to axle mount assembly 270 and alignment assembly 250 is rigidly connected/integrated into beam 212 of suspension assembly 211 in the manner described above, axle 217 is secured to beam 212 of suspension assembly via simple tightening of nuts 292 to bolts 290, and can be removed from the beam simply by untightening the nuts from the bolts. Thus, axle 217 does not need to be welded to beam 212 of suspension assembly 211. As a result, axle 217 with a pair of mount assemblies 270 attached thereto and suspension assemblies 211 can be shipped separately and assembled on site without welding equipment, thereby decreasing shipping costs as compared to axle/suspension systems utilizing prior art axle-to-beam connections with axles irremovably attached to the suspension assemblies during manufacturing. Moreover, as axle-to-beam connection 200 enables axle 217 to be secured to or disconnected from beam 212 of suspension assembly via simple tightening or untightening of nuts 292 to/from bolts 290, the axle-to-beam connection eliminates the need for specialized equipment to remove welds and subsequently reweld the axle to the beam while servicing or replacing the axle, the beam, and/or components of the axle-to-beam connection if they become damaged during operation of the heavy-duty vehicle. Thus, axle-to-beam connection 200 provides improved field serviceability to axle 217, beam 212, and/or components of the axle-to-beam connection if they become damaged during operation of the heavy-duty vehicle.

In accordance with yet another important aspect of the disclosed subject matter, top plate 284 of axle mount assembly 270 includes a substantially vertically-extending boss 280 integrally formed with or otherwise rigidly attached to the top plate via suitable means, such as welding. Boss 280 is formed, such that it is substantially aligned with the respective main member of the heavy-duty vehicle to which the respective hanger (not shown) is attached. Boss 280 acts as a bump stop capable of sufficiently reacting forces imparted on mount assembly 270, and thus exemplary embodiment axle-to-beam connection 200, during extreme jounce events of suspension assembly 211 when the mount assembly strikes the respective main member of the heavy-duty vehicle. Thus, boss 280 prevents potential damage to components of axle-to-beam connection 200, axle 217, and/or the main member during extreme jounce events, while eliminating the need for discrete bump stops attached to or incorporated into components of the axle/suspension system and/or the main member of the heavy-duty vehicle, and reducing heavy-duty vehicle manufacturing costs and complexity.

Thus, exemplary embodiment axle-to-beam connection 200 of the disclosed subject matter includes a structure that enables an axle of an axle/suspension system to be accurately aligned with and quickly and securely attached to a beam of a suspension assembly of the axle/suspension system. Exemplary embodiment axle-to-beam connection 200 provides a strong and secure connection between the axle and the beam, while eliminating line welds on the axle, thereby minimizing stress on the axle, and providing a stronger, more resilient axle-to-beam connection. Furthermore, exemplary embodiment axle-to-beam connection 200 enables shipment of the axle and suspension assemblies of the axle/suspension system separately and facilitates quick and simplified on-site alignment and attachment of the axle to the beams of the suspension assemblies without the need for welding equipment. Moreover, as the axle-to-beam connection of the disclosed subject matter facilitates quick and simplified alignment and attachment of the axle to the beams without the need for welding equipment, the axle-to-beam connection provides improved field serviceability to the axle, beam, and/or components of the axle-to-beam connection. In addition, exemplary embodiment axle-to-beam connection 200 includes a structure that acts as a mechanical bump stop to prevent potential damage to the beam, axle, frame of the heavy-duty vehicle, and/or components of the axle-to-beam connection during jounce events, and decreases manufacturing costs and complexity of the axle/suspension system.

It is understood that exemplary embodiment axle-to-beam connection 200 of the disclosed subject matter can include additional or alternative means for securing the connection between an axle and a beam without affecting the overall concept or operation of the disclosed subject matter. It is contemplated that intimate contact of components of axle-to-beam connection 200 with an axle of a heavy-duty vehicle could create preload or compression at the interface between the outer surface of the axle and the axle contacting surfaces of the components of the axle-to-beam connection to strengthen the axle against loads and resulting stresses encountered during operation of the vehicle. It is further contemplated that exemplary embodiment axle-to-beam connection 200 of the disclosed subject matter could be utilized on heavy-duty vehicles having frames or subframes, which are moveable or non-movable, and having one or more than one axle without changing the overall concept or operation of the disclosed subject matter. It is also contemplated that axle-to-beam connection 200 of the disclosed subject matter could be utilized in conjunction with leading- and/or trailing-arm beam-type axle/suspension system designs with bottom-mount/underslung, top-mount/overslung, or top-mount/underslung beams, including beams made of any suitable material, such as metal, metal alloy, composite, and/or combinations thereof, or with different designs and/or configurations than those shown and described, such as solid beams, shell-type beams, truss structures, intersecting plates, spring beams and parallel plates, without changing the overall concept or operation of the disclosed subject matter. It is yet even further contemplated that axle-to-beam connection 200 of the disclosed subject matter could be utilized in conjunction with axles having any suitable structure, such as straight axles or raised-center axles, and any suitable fixed or varied wall thicknesses or other cross-sectional or overall shapes without changing the overall concept or operation of the disclosed subject matter.

Accordingly, the axle-to-beam connection of the disclosed subject matter is simplified; provides an effective, safe, inexpensive, and efficient structure and method, which achieve all the enumerated objectives; provide for eliminating difficulties encountered with prior art axle-to-beam connections; and solve problems and obtain new results in the art.

In the foregoing description, certain terms have been used for brevity, clarity, and understanding, but no unnecessary limitations are to be implied therefrom beyond the requirements of the prior art, because such terms are used for descriptive purposes and are intended to be broadly construed. Moreover, the disclosed subject matter has been described with reference to a specific embodiment. It shall be understood that this illustration is by way of example and not by way of limitation, as the scope of the invention is not limited to the exact details shown or described. Potential modifications and alterations will occur to others upon a reading and understanding of the disclosed subject matter, and it is understood that the disclosed subject matter includes all such modifications, alterations, and equivalents thereof.

Having now described the features, discoveries and principles of the disclosed subject matter, the manner in which the axle-to-beam connection is constructed, arranged, and used, the characteristics of the construction and arrangement, and the advantageous, new, and useful results obtained; the new and useful structures, devices, elements, arrangements, parts, and combinations are set forth in the claims.

What is claimed is:

1. An axle-to-beam connection for an axle/suspension system of a heavy-duty vehicle comprising:
   an axle;
   a beam including an alignment assembly; and
   an axle mount assembly, said axle mount assembly intimately contacting and capturing said axle, the axle mount assembly including at least one window, the axle being rigidly secured to said axle mount assembly via a continuous weld formed in said at least one window between said axle and the axle mount assembly, the at least one window being located on a front or a rear portion of the axle, said axle being rigidly secured to said axle mount assembly without line welds, the axle mount assembly being removably connected to said alignment assembly to secure the axle to said beam.

2. The axle-to-beam connection of claim 1, wherein said axle mount assembly is removably connected to said alignment assembly with at least one fastener.

3. The axle-to-beam connection of claim 2, said axle alignment assembly including a mounting plate integrally formed with or rigidly attached to a top plate of said beam, said mounting plate being formed with one or more openings for removably connecting said axle mount assembly to said axle alignment assembly via said at least one fastener.

4. The axle-to-beam connection of claim 3, said axle alignment assembly further including at least one attachment bracket, said at least one attachment bracket being disposed about and secured to said beam, the at least one attachment bracket including at least one opening, said at least one opening being vertically aligned with said one or more openings of said mounting plate for removably connecting said axle mount assembly to the axle alignment assembly via said at least one fastener.

5. The axle-to-beam connection of claim 4, said axle alignment assembly further including a spacer positioned between said mounting plate and said at least one attachment bracket.

6. The axle-to-beam connection of claim 1, said axle mount assembly including at least one axle support bracket, said at least one axle support bracket including a profile that corresponds to and is complementary to a front profile or a rear profile of said axle, thereby facilitating said intimate contact between said axle mount assembly and the axle.

7. The axle-to-beam connection of claim 6, wherein said at least one axle support bracket is formed with said at least one window, said continuous weld being formed in the at least one window between the at least one axle support bracket and said axle to rigidly secure the axle to said axle mount assembly.

8. The axle-to-beam connection of claim 7, wherein said axle mount assembly includes a pair of axle support brackets, each one of said axle support brackets being positioned on opposite sides of said axle.

9. The axle-to-beam connection of claim 6, wherein said profile of said at least one axle support bracket is concave and said front profile or said rear profile of said axle is convex.

10. The axle-to-beam connection of claim 6, said axle mount assembly further including a top plate, said top plate being positioned on top of said axle and including a profile that corresponds to a top profile of the axle, the top plate being rigidly secured to said at least one axle support bracket.

11. The axle-to-beam connection of claim 10, wherein said top plate is rigidly secured to said at least one axle support bracket via welding.

12. The axle-to-beam connection of claim 10, wherein said top plate includes an axially extending recess with a concave profile and said top profile of said axle is convex, said concave profile corresponding to said top profile of said axle.

13. The axle-to-beam connection of claim 10, wherein said axle mount assembly further include a bottom plate, said bottom plate being rigidly attached to said at least one support bracket, the bottom plate, the at least one support bracket, and the top plate capturing said axle.

14. The axle-to-beam connection of claim 13, wherein said top plate includes a plurality of first openings and said bottom plate includes a plurality of second opening, said plurality of first openings and said plurality of second openings being vertically aligned with respective openings formed in said alignment assembly, said axle mount assembly being removably connected to the alignment assembly via fasteners disposed through the plurality of first openings, the plurality of second openings, and the respective openings formed in said alignment assembly.

15. The axle-to-beam connection of claim 14, wherein said at least one axle support bracket includes at least one slotted opening, said at least one slotted opening enabling said axle to include varying outer diameters while maintaining vertical alignment of said first openings, said second openings, and said respective openings formed in said alignment assembly.

16. The axle-to-beam connection of claim 1, said axle mount assembly further comprising a structure to act as bump stop during jounce events.

17. The axle-to-beam connection of claim 16, wherein said structure is a boss integrally formed with or rigidly attached to said axle mount assembly.

18. The axle-to-beam connection of claim 1, wherein said axle mount assembly includes at least one shock absorber mounting bracket for attachment of a shock absorber.

19. An axle-to-beam connection for an axle/suspension system of a heavy-duty vehicle comprising:
   an axle;
   a beam including an alignment assembly; and
   an axle mount assembly, said axle mount assembly intimately contacting and capturing said axle, the axle being rigidly secured to the axle mount assembly without line welds, said axle mount assembly being removably connected to said alignment assembly to secure the axle to said beam, the axle mount assembly including at least one shock absorber mounting bracket for attachment of a shock absorber.

20. An axle-to-beam connection for an axle/suspension system of a heavy-duty vehicle comprising:
   an axle;
   a beam including an alignment assembly; and
   an axle mount assembly, said axle mount assembly intimately contacting and capturing said axle, the axle mount assembly including at least one window, the axle being rigidly secured to said axle mount assembly via a continuous weld formed in said at least one window between said axle and the axle mount assembly, the at least one window being located on a front or a rear portion of the axle, said axle mount assembly being removably connected to said alignment assembly to secure said axle to said beam.

* * * * *